United States Patent [19]
Ellner

[11] 4,358,204
[45] Nov. 9, 1982

[54] ULTRASONIC CLEANING APPARATUS

[76] Inventor: Sidney Ellner, R.F.D. #2, Bedford, N.Y. 10506

[21] Appl. No.: 189,136

[22] Filed: Sep. 22, 1980

[51] Int. Cl.³ .............................................. B08B 3/12
[52] U.S. Cl. .................................................. 366/118
[58] Field of Search .............. 366/109, 116, 117, 118, 366/127, 128; 68/3 SS; 134/1, 184; 310/337; 422/23, 24; 204/302, 307

[56] References Cited

U.S. PATENT DOCUMENTS

| | | | |
|---|---|---|---|
| 3,052,244 | 9/1962 | Gley | 134/1 X |
| 3,240,963 | 3/1966 | Sasaki | 134/1 X |
| 4,214,962 | 7/1980 | Pincon | 422/24 X |
| 4,244,749 | 1/1981 | Sachs et al. | 134/184 X |

*Primary Examiner*—Philip R. Coe
*Attorney, Agent, or Firm*—Edward F. Levy

[57] ABSTRACT

An ultrasonic cleaning assembly for cleaning large objects immersed in liquid within a chamber, such as an array of elongated ultraviolet lamps within an ultraviolet purification tank. The cleaning assembly includes an elongated ultrasonic transducer extending across the width of the chamber and having a width appreciably smaller than the length of the chamber and the objects therein to be cleaned. Motor-driven apparatus is provided for moving the transducer within the chamber in such a manner as to direct the ultrasonic waves emitted by the transducer to all interior portions of the chamber, thereby applying the ultrasonic cleaning effect over the entire extent of all the objects within the chamber. In a first embodiment the transducer is moved linearly in a horizontal direction across the length of the chamber, and in a second embodiment, the transducer is centrally mounted within the chamber and is rotated about its longitudinal axis.

8 Claims, 7 Drawing Figures

ULTRASONIC CLEANING APPARATUS

The present invention relates to ultraviolet purification systems in which a plurality of ultraviolet radiation lamps are disposed in a tank to purify water or other liquid flowing therethrough, and in particular relates to an ultrasonic cleaning device for cleaning the ultraviolet lamps and maintaining them free of impurity coatings.

The use of ultraviolet radiation for the purification treatment of water has proved to be extremely effective and is now widely used. In typical installations, a liquid such as waste water flowing from a reservoir or other source, is directed through a chamber containing a battery of ultraviolet lamps arranged to apply to all portions of the water flow a selected dosage of ultraviolet radiation. Sophisticated systems have been developed for monitoring the effective radiation produced by each lamp as well as the radiation penetration through the poluted water, and the rate of flow of the water through the chamber is regulated accordingly, in order to insure an optimum ultraviolet dosage.

A difficulty encountered in the use of ultraviolet purification systems is the tendency of the ultraviolet lamps to become coated with sediment or other impurities carried by the water flowing through the purification chamber. Such a coating reduces the amount of ultraviolet radiation emitted by one or more lamps in the system and results in inadequate treatment of the liquid flow. For acceptable operation of the system, it is essential that each of the lamps be operating at maximum capacity.

I have found that ultrasonic devices would be effective for cleaning ultraviolet lamps of the purification system and removing deposited impurities from the lamp surfaces. The use of ultrasonic frequency generators for cleaning purposes has been widely accepted for treating relatively small enclosures or components such as jewelry, dental appliances, or the like. However, because of the large size of the purification chamber, the use of conventional ultrasonic devices presently available would be impractical. Purification systems are presently in use with hundreds and sometimes thousands of ultraviolet lamps, which are required in order to treat liquids of varying flow rates. In order to apply ultrasonic treatment to such a wide array of lamps over such a wide area, an extremely large ultrasonic transducer would ordinarily be required, or a large number of transducers would have to be employed to cover the entire lamp area. Because of the high cost of ultrasonic transducers and the energy costs involved, the use of the ultrasonic cleaning principle for large chambers or components has seemed economically prohibitive.

I have found that a single ultrasonic transducer can be employed to provide effective cleaning of a large array of lamps or other components in a chamber of very large area, by providing means to move the transducer in such a manner as to direct its ultrasonic force over the entire area of the chamber and over all of the components therein.

It is an object of the present invention, therefore, to provide ultrasonic cleaning apparatus for periodic cleaning of large articles immersed in a liquid within a tank or chamber, which apparatus is particularly suited for the cleaning of ultraviolet radiation lamps in an ultraviolet purification system.

Another object of the invention is the provision of ultrasonic cleaning apparatus in which a single, small ultrasonic transducer is utilized to perform an effective cleaning function over a wide chamber area, so as to clean large articles, such as elongated ultraviolet lamps, within said chamber.

Still another object of the invention is the provision of an ultraviolet cleaning apparatus of the character described in which a single ultrasonic transducer or a single line of transducers is associated with a tracking system adapted to move the transducer in such a manner as to direct its ultrasonic vibrational waves to all portions of a large chamber thereby effectively cleaning a plurality of large articles within the chamber. A single transducer or line of transducers of standard small size may thus be employed to effect cleaning over a large area, which normally would require the use of a large number of transducers.

A further object of the invention is the provision of an ultrasonic cleaning apparatus of the character described which utilizes a single ultrasonic transducer or line of transducers of small size and standard construction, so that it consists of few parts and is economical in manufacture.

In accordance with the invention herein, there is provided an ultrasonic cleaning apparatus for use in cleaning large objects immersed in liquid within a large chamber, and particularly useful, for example, in cleaning an array of ultraviolet lamps mounted within a tank in an ultraviolet purification system. The ultrasonic cleaning apparatus comprises a single ultrasonic transducer or line of transducers of substantially small size relative to the area of the chamber or tank, and tracking means for moving the transducer in such a manner as to direct the ultrasonic vibrational waves emitted thereby over the entire extent of the chamber in order to clean all of the objects contained therein.

In one embodiment of the invention, the tracking means comprises a drive assembly mounting said transducer and adapted to move the transducer in a horizontal direction along the length of the chamber. In another embodiment, the transducer is rotatably mounted in the chamber, and the tracking means comprises a drive assembly adapted to selectively rotate the transducer about its central longitudinal axis in order to direct the ultrasonic energy emitted by the transducer to all portions of the chamber.

Additional objects and advantages of the invention will be apparent during the course of the following specification when taken in connection with the accompanying drawings, in which.

Figure 1:
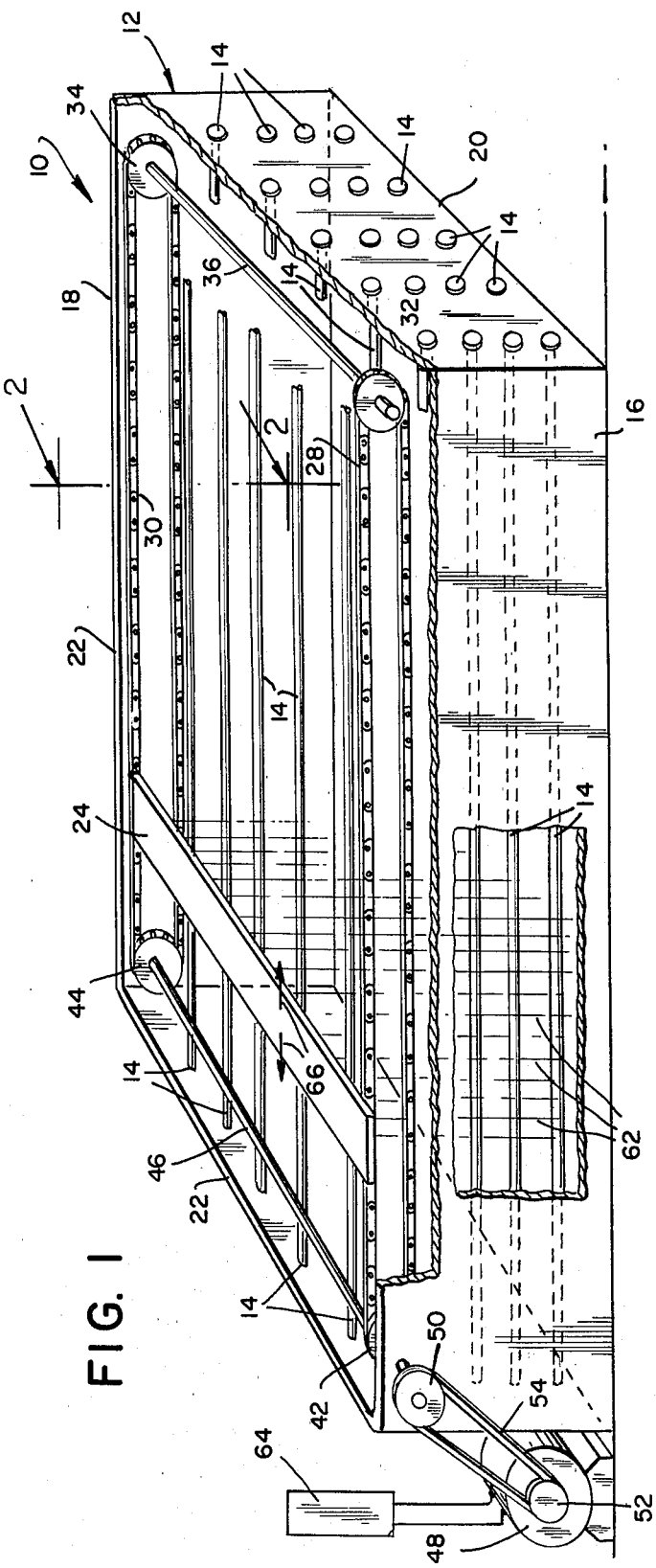
FIG. 1 is a perspective view of an ultraviolet purification tank with the ultrasonic cleaning assembly of the present invention mounted therein, with portions of the tank broken away to reveal the interior thereof.
Figure 2:
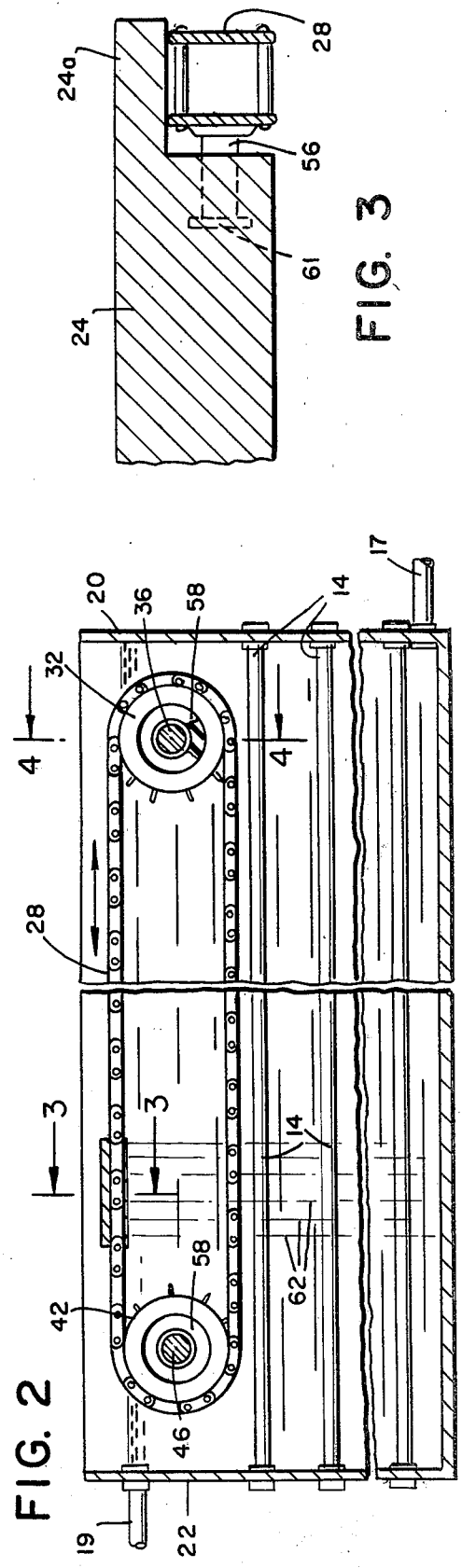
FIG. 2 is an enlarged longitudinal section through the upper portion of the tank of FIG. 1, showing the ultrasonic cleaning assembly therein.

Referring in detail to the drawings, there is shown in FIGS. 1-4 an ultrasonic cleaning assembly 10 made in accordance with the present invention and adapted to be applied to a chamber containing large articles to be cleaned. By way of preferred example, the chamber is shown as an ultraviolet purification tank 12 which contains an array of ultraviolet lamps 14 which emit ultraviolet radiation to water or other liquid flowing through the tank 12.

The tank 12 is elongated, having side walls 16 and 18, and end walls 20 and 22. The ultraviolet lamps 14 are the usual tubular, elongated, gaseous lamps and may be four feet in length or longer. The lamps extend parallel to the tank side walls 16 and 18, and perpendicular to the end walls 20 and 22, being equally spaced from each other and arranged in a grid array of horizontal rows and vertical columns, in the manner shown in FIG. 1, in order to apply ultraviolet radiation of equal intensity to all portions of the stream of water flowing through the tank. In the embodiment illustrated, the lamps 14 are arranged in four horizontal rows and ten vertical columns. Each lamp 14 has an elongated cylindrical transparent, U-V transmitting envelope encased in a quartz tubing which serves as a protective cover therefor.

In operation of the purification system, the tank 12 is normally filled with water or other liquid to be purified, which flows from an inlet opening 17 to an outlet opening 19 of the tank. The ultraviolet radiation emitted by the equally-spaced lamps 14 is applied evenly to all portions of the water stream, which is purified by the ultraviolet dosage. In practice, however, sediment or other impurities in the water deposits on the surface of the lamps or the quartz tubing in which they are encased, resulting in an opaque coating which decreases the radiation emitted. The ultrasonic cleaning assembly 10 is provided to remove such coatings and clean the lamps at selected intervals.

In the embodiment of FIGS. 1-4, the ultrasonic cleaning assembly comprises an ultrasonic transducer 24 mounted on a transverse tracking system 26 which moves the transducer in a horizontal plane along the length of the tank 12. The transducer 24 is of standard construction, and is made in the narrow, elongated shape shown in FIGS. 1 and 2, of sufficient length to entend substantially across the entire width of the purification tank 12, so that it will overlie the entire extent of the lamps 14 arranged in the horizontal rows as shown.

The tracking system 26 mounting transducer 24 comprises a pair of endless chain belts 28 and 30 located proximate to the respective side walls 16, 18, and extending parallel thereto. The belts 28 and 30 are trained about a pair of idler sprockets 32 and 34 mounted on a common shaft 36 which is journalled in the tank side walls 16 and 18. The belts are also trained about a pair of drive sprockets 42 and 44 mounted on a common shaft 46 which is journalled in the tank side walls. The end of shaft 46 extends through the side wall 16 and is connected to the drive shaft of a reversible electric motor 48 by means of pulleys 50, 52 and drive belt 54.

Figure 3:
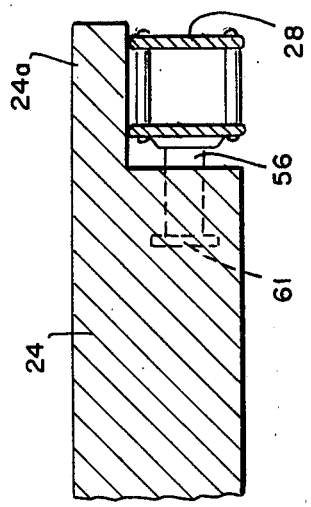
FIG. 3 is an enlarged section taken along line 3—3 of FIG. 2.

The transducer 24 is of the usual construction capable of generating ultrafrequency vibrations, and may be of the magnetostrictive, piezo-electric or electrodynamic types, all of which are well-known and commercially available. As previously indicated, the transducer 24 is made in the rectangular shape shown in FIG. 1, with a length slightly greater than the distance between the chain belts 28 and 30, and with a width appreciably shorter than the length of the tank 12 and the lamps 14 mounted therein. The transducer 24 extends between the endless chain belts 28 and 30, as shown in FIG. 1, and is secured thereto so as to be moved along the length of the tank 12 when the chains are rotated. For this purpose, the transducer 24 is formed at each end with a shoulder 24a which overlies the respective chain belt 28 or 30, as shown in FIG. 3, and is secured to the chain belt by a metal connecting pin 56 which is electrically conductive.

Figure 4:
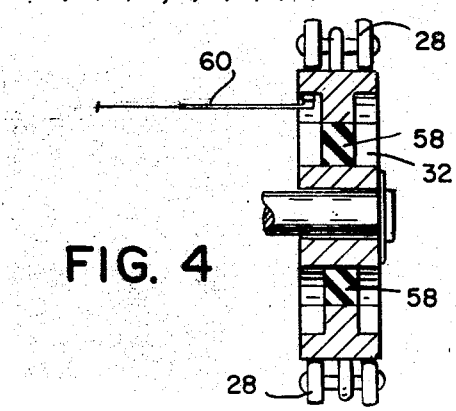
FIG. 4 is an enlarged section taken along line 4—4 of FIG. 2.

In order to electrically energize the transducer 24, the terminals of an electric power source (not shown) are connected to terminals at the opposite ends of the transducer 24 through the idler sprockets 32, 34 and the endless chain belts 28 and 30. Each of the sprockets 32, 34, 38 and 40 is provided with a hub 58 of insulating material, as best shown in FIG. 4, which electrically insulates said sprocket from the shaft 36 or 46 upon which it is mounted. A contact arm 60, connected to one pole of the electrical power source, makes wiping contact with the body of the idler sprocket 32 with the current passing through the electrically conductive sprocket 32, the electrically conductive chain belt 28, and the connecting pin 56 to a terminal 61 at one end portion of the transducer 24 (FIG. 3). In an identical manner, a similar contact arm 60, connected to the opposite pole of the electrical power source, makes wiping contact with the body of the other idler sprocket 32, and through the chain belt 30 with a terminal at the opposite end portion of the transducer 24. The terminals 61 are connected to ultrasonic generating means within the transducer. The transducer 24 is thus energized to produce vibrations of ultrasonic frequency as it is drawn by the endless chain belts 28 and 30 along the length of tank 12.

The transducer 24, being mounted at the upper end of the tank 12, above the array of lamps 14, generates ultrasonic compressional and vibrational waves in the form of a downwardly-directed vertical beam indicated at 62 in FIG. 1, which beam 62 has an area corresponding to the area of the transducer 24, and extends downwardly to the bottom of tank 12. Thus the ultrasonic cleaning effect is applied to the portions of all of the lamps 14 located immediately beneath the transducer 24. When the motor 48 is operated to turn the endless chain belts 28 and 30, the transducer 24 is drawn by said belts in a path of travel along the length of the tank 12 and the lamps 14 therein, and the vertical ultrasonic beam 62 travels along the entire lengths of the lamps 14 so that the latter are cleaned over their entire extent.

Control means 64, shown schematically in FIG. 1, may be provided for automatically controlling operation of the electric motor 48. The control means 64 may include timing means for energizing the motor 48 at selected periodic intervals to move the transducer 24 in the direction of arrow 66 in FIG. 1, stopping the motor 48 when the transducer 24 reaches the end of its run at the right-hand end of tank 12, and reversing the motor to cause the transducer to move in the opposite direction in a reverse run to the left hand end of the tank 12. The control means 66 may be pre-set to cause the transducer to move in a single run or in multiple runs in each operating cycle, depending upon the amount of cleaning required. The control means 64 is also operative to control energization of the transducer 24, so that the transducer is energized only during an operative cycle in which it is moving through the tank 12. Since the control means 64 comprises conventional and well-known electrical circuitry, it is not shown in detail herein.

Figure 5:
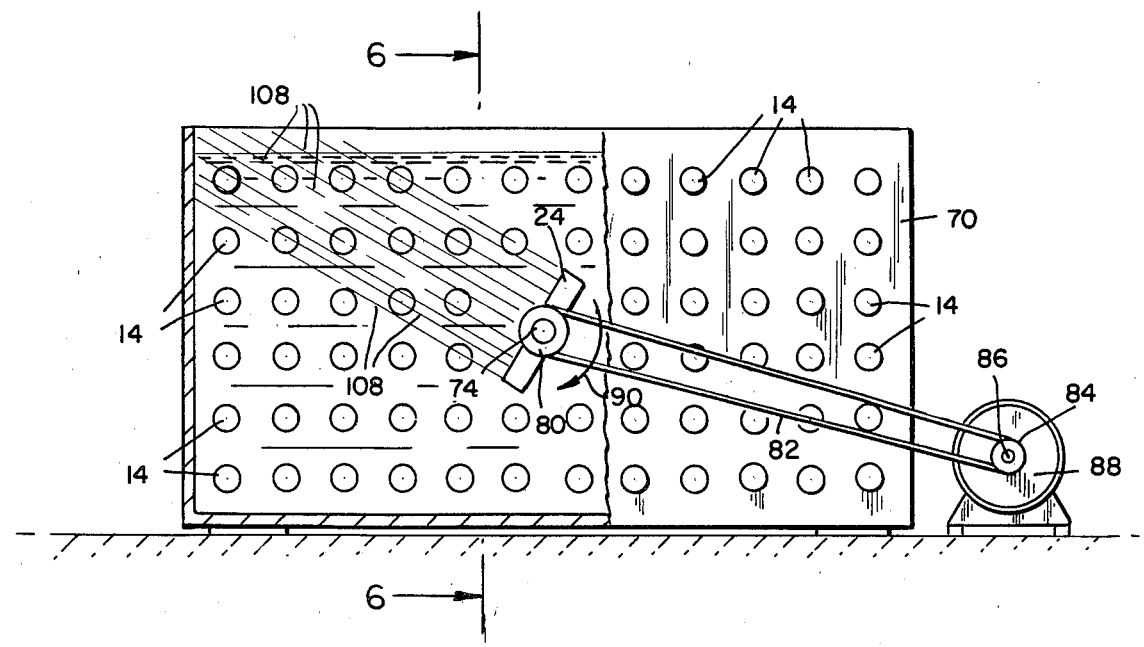
FIG. 5 is an end elevation view of a tank containing a modified embodiment of ultrasonic cleaning assembly, with a portion of the tank broken away and shown in section.
Figure 6:
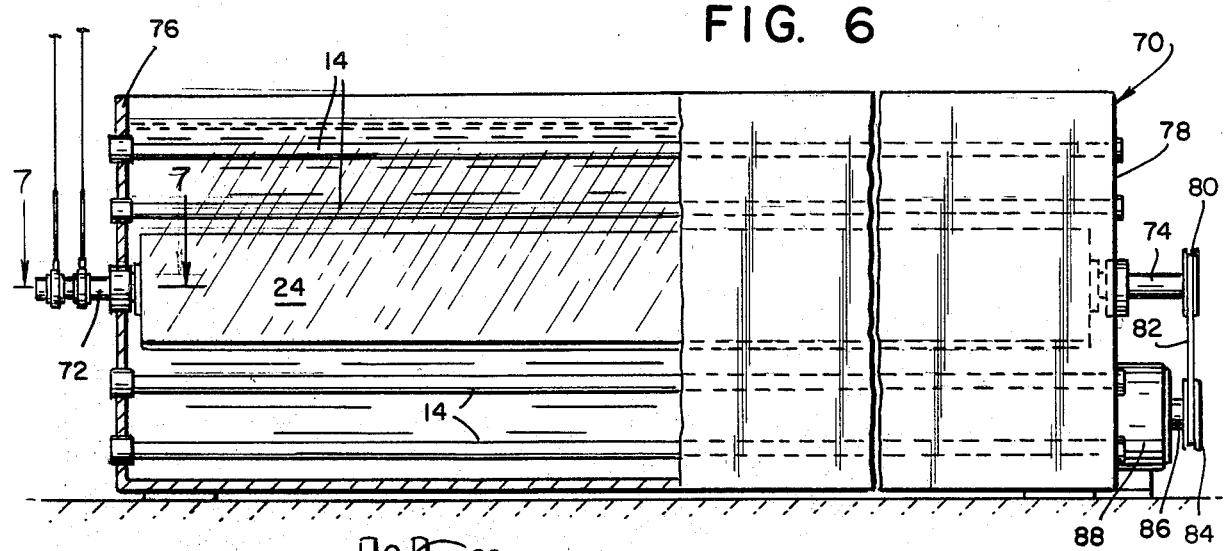
FIG. 6 is a sectional view taken along line 6—6 of FIG. 5.
Figure 7:
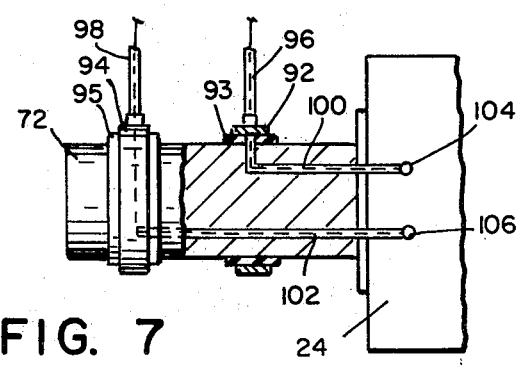
FIG. 7 is an enlarged section taken along line 7—7 of FIG. 6.

In FIGS. 5-7 there is shown a modified embodiment of an ultrasonic cleaning assembly made in accordance with the present invention. In this embodiment a single ultrasonic transducer 24, identical to the transducer previously described, is again employed, but in this instance, the transducer is imparted with a rotational movement instead of being moved in a horizontal path.

The ultraviolet purification tank 70 illustrated in FIG. 5 is shown, by way of example, as containing an array of elongated ultraviolet lamps 14 arranged in six horizontal rows and twelve vertical columns. In the center of the tank 70, four of the lamps 14 are eliminated to provide clearance for the rotatable mounting of the ultrasonic transducer 24. At its ends, the transducer 24 is secured to respective shafts 72 and 74 which extend through sealed bearings in the tank end walls 76 and 78, and are journalled therein.

Exteriorly of the tank 70, the shaft 74 is secured to a pulley 80 which is connected by an endless belt 82 to a pulley 84 on the drive shaft 86 of an electric motor 88 mounted on the tank end wall 78. When the motor 88 is energized, the transducer 24 is rotated about its central longitudinal axis, by means of the shafts 72 and 74, in the direction of the arrow 90 shown in FIG. 5.

FIG. 7 illustrates the manner in which the transducer 24 is electrically energized to produce ultrasonic vibration during its rotational movement. The shaft 72 has a ring 92 of electrically conductive material extending around the circumference of said shaft 72 and electrically insulated therefrom by a layer of insulation 93. The shaft 72 also has a second electrically-conductive ring 94 spaced from ring 92 and electrically insulated from the body of shaft 72 by a layer of insulation 95. A pair of contact arms 96 and 98 make wiping contact with the respective rings 92 and 94, the contact arm 96 being connected to one terminal of an electrical power source and the contact arm 98 being connected to the other terminal thereof. The contact arms 96 and 98 are connected to respective insulated leads 100 and 102 which extend through the body of shaft 72 and are connected to the terminals 104 and 106 of transducer 24.

Timing means (not shown) are provided for energizing the motor 88 at periodic intervals for a selected time, and for simultaneously energizing the transducer 24. As the energized transducer 24 is rotated by the motor 88, it emits from its vibrating surface a beam 108 of ultrasonic compressional and vibrational waves, which beam has an area corresponding the area of the transducer 24, and extends to the walls of the tank 70, as indicated in FIG. 5. As the transducer 24 rotates, the beam 108 sweeps the entire inner area of the tank 70 and is applied to all the lamps 14 contained therein, effectively cleaning the quartz casings of the lamps.

In the two embodiments described above, the motor was described as drawing the transducer 24 in a horizontal direction in a continuous movement, and as rotating the transducer continuously. It will be understood, however, that the motor may have a conventional intermittent drive so that it moves the transducer in interrupted increments either in a horizontal plane or rotationally. Thus, the energized transducer may be moved for a short distance, stopped for a short period of time to provide its cleaning action, moved for another short distance, etc.

In the illustrated embodiments, the transducer 24 is shown as having an integral elongated body. For practical purposes, it may be desirable to arrange a number of shorter transducers in a straight line and mount them on a common carrier. The group of transducers would, in this case, present a contiguous vibrating surface, and would be regarded as a single elongated transducer. It will thus be understood that where reference is made to an "elongated transducer", this would include a plurality of short transducers arranged in a single elongated row.

As previously described, the lamps 14 used in an ultraviolet purification system are usually covered by a quartz tube to prevent electrical shorting. This quartz tube can be regarded as part of the lamp itself, and where reference is made herein to the cleaning of the lamps, it is meant to include the cleaning of the quartz tubes which cover the exterior of the lamps.

While preferred embodiments of the invention have been shown and described herein, it is obvious that numerous omissions, changes and additions may be made in such embodiments without departing from the spirit and scope of the invention.

What is claimed is:

1. An ultrasonic cleaning assembly for cleaning elongated tubular lamps emitting ultraviolet radiation and disposed in horizontal rows immersed in liquid within a tank of an ultraviolet purification system, said tank having side walls and end walls, said cleaning assembly comprising, a single elongated ultrasonic transducer having a length substantially equal to the spacing between the side walls of said tank and a width appreciably less than the distance between the end walls of said tank, mounting means for movably mounting said transducer in a horizontal position within said tank with said transducer extending longitudinally between the side walls of said tank and being in contact with the liquid therein, means for energizing said transducer to cause the latter to emit a beam of ultrasonic vibrational waves through the liquid in said tank, and drive means for moving said transducer in its energized state within said tank in a direction to cause said beam to sweep substantially the entire inner area of said tank and to traverse all of the lamps within said tank.

2. An ultrasonic cleaning assembly according to claim 1 in which said mounting means comprises a plurality of endless belts connected to the opposite ends of said transducer and positioned to support said transducer horizontally within said tank, said belts extending parallel to said tank side walls and extending substantially from one end wall to the other, said drive means comprising a motor for moving said belts in a direction to draw said transducer in a horizontal plane from one end portion of the tank to the opposite end portion thereof.

3. An ultrasonic cleaning assembly according to claim 2 in which said energizing means comprises contact means for connecting said transducer to a source of electrical current.

4. An ultrasonic cleaning assembly according to claim 3 in which said endless belts are electrically-conductive chain belts trained about electrically-conductive sprockets, said contact means comprising a pair of contacts respectively connected to the terminals of said source of electrical current and making wiping contact with a respective sprocket of each chain belt and through said belt to a respective terminal of said transducer.

5. An ultraviolet cleaning assembly according to claim 1 in which said mounting means comprises at least one shaft rotatably mounting said transducer in the central portion of said chamber for turning movement of said transducer about its central longitudinal axis.

6. An ultraviolet cleaning assembly according to claim 5 in which said drive means includes a motor operatively coupled to said shaft for rotating said shaft and said transducer in a direction to cause the beam of ultrasonic vibrational waves emitted by said transducer to sweep the entire interior extent of said chamber.

7. An ultrasonic cleaning assembly according to claim 6 in which said energizing means comprises a pair of contact rings mounted on said shaft and connected to the terminals of said transducer, and a pair of contact members making wiping contact with said rings and connected to the terminals of a power source.

8. An ultrasonic cleaning assembly according to claim 6 in which said chamber is a tank of an ultraviolet purification system, and in which said large objects are elongated tubular lamps emitting ultraviolet radiation and arranged in an array of horizontal rows and vertical columns within said tank, said transducer being rotatably mounted centrally within said array of lamps.

* * * * *